United States Patent [19]

Magnuson

[11] 4,046,217

[45] Sept. 6, 1977

[54] ROLL, PITCH, AND HEAVE STABILIZATION DEVICE FOR AIR-CUSHION-BORNE VEHICLES

[76] Inventor: Allen H. Magnuson, 2014 Hanover St., Silver Spring, Md. 20910

[21] Appl. No.: 668,370

[22] Filed: Mar. 19, 1976

[51] Int. Cl.² .............................................. B63B 1/36
[52] U.S. Cl. .................................. 180/126; 114/67 R
[58] Field of Search ............... 180/126, 121, 116, 117, 180/119, 120; 114/67 R, 67 A

[56] References Cited

U.S. PATENT DOCUMENTS

| | | | |
|---|---|---|---|
| 1,819,216 | 8/1931 | Warner | 114/67 A |
| 3,146,752 | 9/1964 | Ford | 114/67 A |
| 3,191,705 | 6/1965 | Jones et al. | 180/126 |
| 3,198,274 | 8/1965 | Cocksedge | 180/126 X |
| 3,373,837 | 3/1968 | Guienne | 180/118 |
| 3,473,503 | 10/1969 | Gunther | 180/126 X |
| 3,532,180 | 10/1970 | Ford et al. | 180/126 |
| 3,915,107 | 10/1975 | Hilbig | 114/67 R |

*Primary Examiner*—Philip Goodman
*Attorney, Agent, or Firm*—R. S. Sciascia; Q. E. Hodges

[57] ABSTRACT

An automatic roll, pitch, and heave stability device for air-cushion-borne vehicles equipped with semi-rigid planing bow and stern seals, the latter which may be divided into separate port and starboard seals, and with rigid side-walls. Each seal at its trailing edge is mechanically linked to, and controls, a bypass duct valve. The linkage is arranged so that pressure in the seal increases as the seal is forced up due to a wave crest, and decreases as the seal drops away from the vehicle body in a wave trough. Vehicle stability in heave is achieved by the bow and stern seals operating in unison; in pitch, by the bow and stern seals operating oppositely; and in roll, by the split port and starboard seals operating oppositely. The system operates both while the vehicle is underway, and with changes in load on the vehicle in calm water.

11 Claims, 2 Drawing Figures

ROLL, PITCH, AND HEAVE STABILIZATION DEVICE FOR AIR-CUSHION-BORNE VEHICLES

The invention described herein may be manufactured and used by or for the Government of the United States of America for governmental purposes without the payment of any royalties thereon or therefore.

BACKGROUND OF THE INVENTION

Existing prior art inflated planing-type or semi-planing seals on surface effect ships are generally designed to maintain a constant overpressure relative to the air cushion pressure which they contain. The amount of overpressure may be adjusted manually by use of valves which vary the effective cross-sectional area of orifices in the discharge ducts which may vent the seal air into the main air cushion. One major disadvantage of this prior art arrangement is that the seals cannot produce static stabilizing forces and moments to compensate for longitudinal and lateral shifts in weights, or changes in overall weight and weights distribution of the craft. In addition, there is no provision for direct dynamic stabilization in waves. For example, the bow seal cannot produce a force proportional to the instantaneous clearance of the bow above the water surface that would tend to lift the bow of the vehicle over waves being encountered. In the static situation, each of the prior art seals only produce a constant force while in contact with the water.

Further, existing vehicles, with rigid sidewalls, rely primarily on the hydrostatic and hydrodynamic forces acting on the sidewalls to provide for roll and pitch stability. Consequently, the designer of rigid sidewall vehicles (captured air bubble vehicles, for example) has little or no means of control over the dynamic or static characteristics of the craft in roll and pitch. Therefore, existing craft have inadequate damping characteristics in pitch and roll, which result in resonance and excessive motion in waves. This deficiency in dynamic performance is corrected by means of a properly designed device of this invention to be described hereinafter.

Prior art vehicles obtain some stabilization dynamically from the transient overpressure in the seals caused by rapid changes in seal forces which are in turn produced by seal contact with the changing water surface heights. Again, the designer formerly had little control over this type of dynamic effect, because the fixed orifice area discharge in the ducts is pre-determined by the designed-in static overpressure in the seals.

For example the prior art has no concern with the direct control of the vehicle's height above the supporting surface. All appear to control either heave, pitch, or roll, or a combination thereof, by means of sensing pressures in various components of a fully-skirted craft. The pressure in a given compartment is related only indirectly to the relative height of that compartment over the supporting surface. The varying pressures are used to activate various control means that may adjust the flow and/or volume of the compartments.

In summary, the overall performance of an air-cushion-borne vehicle reltes to the suspension system (i.e., the seal, the air cushion, and the air feed system). This performance can be characterized by the various stiffness, damping characteristics, and natural frequencies associated with air cushion vehicles. The stiffnesses, which characterize static performance, are expressed in terms of the ratio of incremental loading forces to the resulting incremental local clearances of the vehicle above the surface. The damping and natural frequency, in addition to stiffnesses, characterize the dynamic behavior of the vehicle.

Therefore it is important to distinguish between static and dynamic response, and overall stability. Static stability is characterized solely by stiffnesses of various components of the suspension system, which compensate for the vehicle's overall weight and trim. Dynamic stability performance is governed by the stiffnesses, damping characteristics, and natural frequencies of the vehicle in pitch, roll, and heave, as it encounters irregular surfaces including wave crests and troughs.

SUMMARY OF THE INVENTION

Briefly, the instant invention overcomes the disadvantages of the prior art-cushion-borne vehicles by providing direct, static and dynamic sensing and control of the height of any portion of the vehicle over the water. A mechanical linkage, such as a pushrod is attached to the forward semi-rigid planing bow seal, and other pushrods are separately attached to the stern seals. The distance measurement obtained is used to activate control means, such as bypass valves, that adjust the pressure in the seal that acts upon the water. This obviously, is the most direct means of controlling height and attitude of the vehicle. Pitch and heave can be controlled without splitting the stearn seal into port and starboard sections. If roll is to be controlled also, the stearn seal is separated into port and starboard sections with an intermediate longitudinal skeg at the center line of the under-hull. In the latter case, separate port and starboard ducting would be required, as well as separate sensing and control means.

STATEMENT OF THE OBJECTS OF INVENTION

Accordingly, an objective of the present invention is to provide a new, improved, and reliable means of controlling pitch, heave, and roll on an air-cushion-borne vehicle.

Another objective of the present invention is to provide direct sensing and control of the height and attitude of a air-cushion-borne vehicle above the surface of the water over which it travels.

Still another objective is the instant invention is to provide bow and stearn air-cushion seals wherein the pressure in the seal increases as the seal is forced up due to a wave crest, and decreases as the seal drops away from the vehicle body in a wave trough.

A still further objective of the instant invention is to achieve vehicle stability, while not under-way, due to load shifting and natural oncoming seas.

BRIEF DESCRIPTION OF THE DRAWINGS

A more complete understanding of the invention and many of the attendant advantages thereto will be apparent from the following detailed description when considered in conjunction with the accompanying drawings, wherein.

DESCRIPTION OF THE PREFERRED EMBODIMENTS

Figure 1:
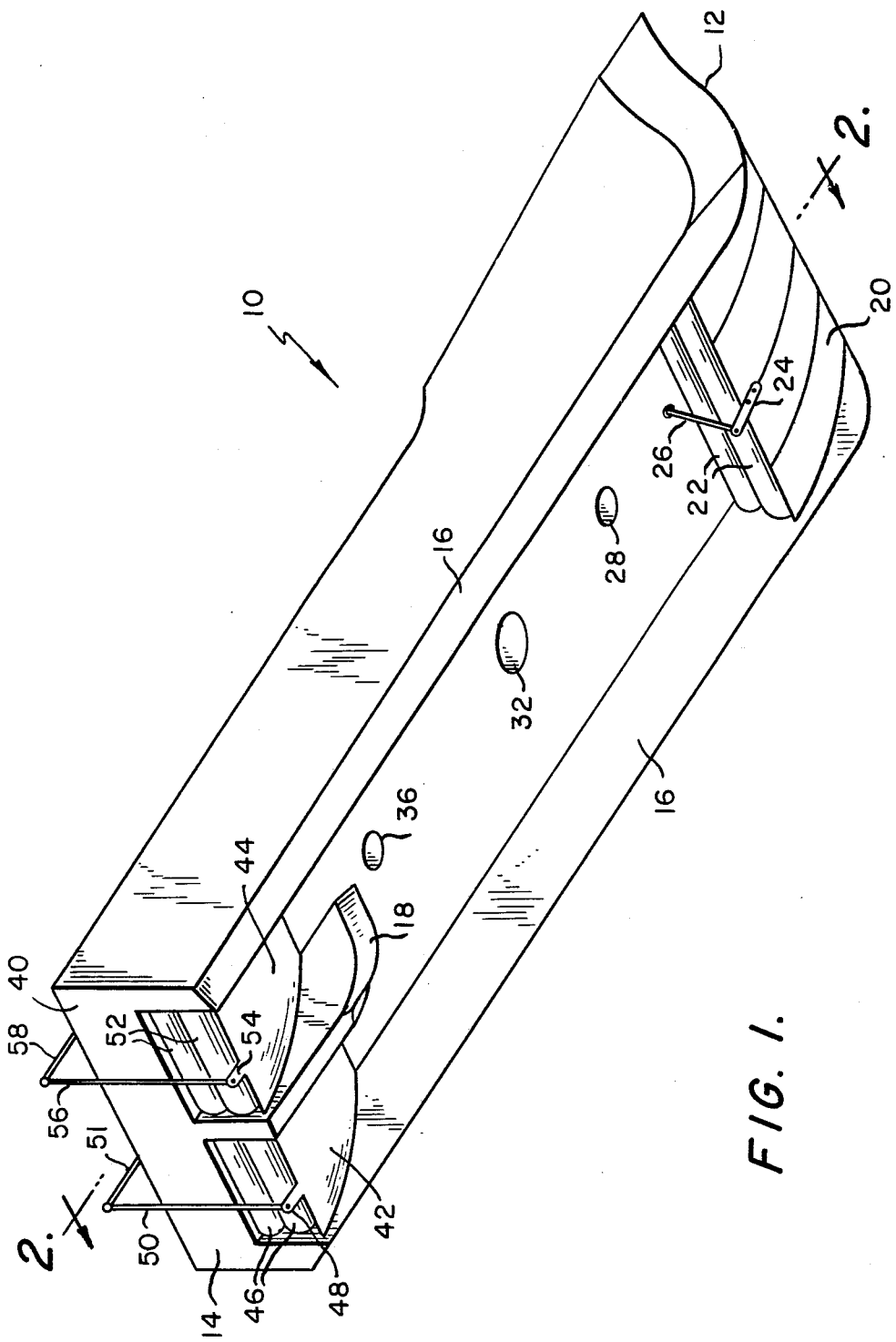
FIG. 1 is a perspective stern quarter underside view of the stabilized air-cushion-borne vehicle.

Referring now to the drawings wherein like numerals refer to the same element there is shown in FIG. 1, generally an air-cushion-borne vehicle 10, having a bow 12 and a stern 14.

Figure 2:
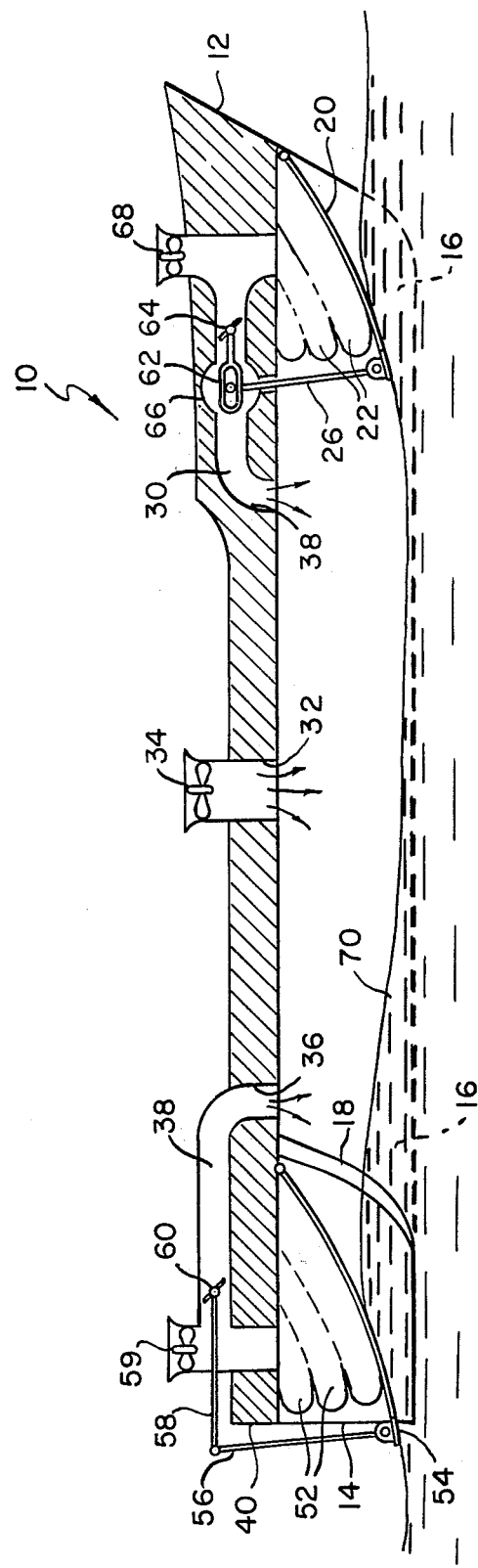
FIG. 2 is a cross-sectional side view taken along a longitudinal line of the vehicle and mid-way across a stern seal showing the details of the invention.

Referring to both FIGS. 1 and 2 there are shown vertical rigid port and starboard sidwalls 16. At the bow 12, between the sidewalls 16, there is a semirigid planning bow seal 20 having inflatable bellows 22. A bracket member 24 is affixed to the trailing edge of the planing bow seal 22 and is further attached to a pushrod 26.

Continuing aft from the bow seal 20, there is an exhaust port 28 for bow seal bypass duct 30, a main cushion air feed port 32, above which is a main air cushion fan 34 (if required) and an exhaust port 36 for stearn seal bypass duct 38. The main air cushion fan and port are optional, and are not part of the invention.

Referring particularly to FIG. 1, the stern seals are divided by a skeg 18 shown having a sharp leading edge and continuing aft to the transom 40 so as to form an inner side sealing surface for each of the port stern seal 42 and starboard stern seal 44 along the centerline of the air-cushion-borne vehicle. Referring to the stern seals, they are substantially the same type semi-rigid planing seals as the bow seal, except that they are separated port and starboard. The port stern seal 42 has bellows 46, and a tab 48 attached to the trailing edge. A port control linkage, including pushrod 50 and lever 51, is attached at one end to the tab 48. Likewise, the starboard stern seal 44 has bellows 52, and a tab 54 attached to the trailing edge. A starboard control linkage, including pushrod 56 and lever 58 is attached at one end to the tab 54.

Referring particularly to FIG. 2, the stern starboard control linkage 56 (port control linkage not shown here) is connected at the top to a valve lever 58 ultimately connected to a valve 60, in the stern seal bypass duct 38 which valve may be a butterfly valve or the like. If the valve 60 be a butterfly valve it may be simply rotated about its axis by the up and down motion of the lever 58 in response to the movement of the pushrod 56. A stern seal fan 59 is mounted above, and directs flow into, this starboard stern seal. The bow seal pushrod 26 is attached at its top end to a valve lever 62, which is slotted to allow sliding motion as it rotates to control the position of valve 64, which may be of the butterfly type. To allow for lever travel, cut-outs 66 are provided along the sides of the duct 30. Forward of valve 64 is duct 30, and above the bow seal, is mounted a bow seal fan 68 which directs flow into the forward bow seal 20.

In operation of this vehicle that is automatically stabilized in roll, pitch, and heave, it can be now understood that the rigid sidewalls 16, the bow seal 20, and port stern seal 42, and the starboard stern seal 44 from the periphery of an air cushion chamber or plenum. The main cushion fan 34 may provide air pressure if required for the main lift of the vehicle off the water surface 70 if the seal fans 59, 68 do not provide enough air for this purpose. The bow seal fan 68 directly feeds air pressure to the semirigid bow seal 20 to seal it against the water surface 70. The stern seal fan 59 is shown feeding pressurized air to the semi-rigid port stern seal 44, or it may feed both port and starboard stern seals through a bifurcated duct system (not shown).

The excess pressurized seal air that is produced when the bow and port and starboard stern seals are forced up toward the vehicle is exhausted through the stern bypass duct 38 (starboard not shown) and the bow bypass duct 30 to the main air cushion chamber, and controlled by the butterfly valves 60 and 64, respectively. Alternatively the port and starboard stern seals may have separate bypass ducts.

As to the butterfly valves 60 and 64, they may be rotated to a predetermined mean setting, depending on the static weight and balance of the vehicle. When the vehicle is underway and encountering waves, the bow and/or stern seals are forced up on a crest and drop down in a trough. This dynamic movement of the trailing edges is transmitted, through the tabs 24, 48, 54, the pushrods 26, 50, 56, and valve levers 51, 58, 62, to the valves 60, 64.

The basic principle is that automatic control variation of the seal duct orifice discharge area (via the valves) is achieved according to seal motion in order to produce a vehicle-stabilizing force. The mechanical linkage shown is quite feasible, but for large vehicles, seal position may be remotely sensed, for example, by sonic or radar probes or potentiometers, for use with servo-mechanisms to actuate the flow control valves. In a vehicle with mechanical linkage, the damping characteristics in pitch, heave, and roll may be suitably adjusted by proper selection of the fan characteristics and the dimensions of valves, and mechanical linkages. In larger vehicles, having remote sensors for seal height and valve servomechanisms, the damping characteristics may also be adjusted by providing additional sensors for pitch, roll, and other rate variations. These additional sensed signals, may than be filtered and mixed with the seal height signals to actuate controlling valve servomechanisms.

Specifically, the leakage area in the seals and seal ducts varies due to the valve position controlled by the linkage arrangement in such a way that the seal back-pressure increases as the seals are compressed and forced up toward the body of the vehicle, and decreases as the seal extends. Most prior art seals act oppositely to soften ride, but these vehicles tend to impact with waves where the bow comes into contact with a wave. In this invention, the change in seal pressure then produces a stabilizing force on the water that tends to keep the vehicle at a constant distance above the water surface so that the bow tends to lift over waves. For example, to stabilize heave, all seals work in unison. To stabilize pitch, the bow and stern seals operate in opposition and finally to stabilize roll, the port and starboard stern seals operate in opposition.

Obviously, many modifications and variations of the present invention are possible in light of the above teachings. It is therefore to be understood that within the scope of the appended claims, the invention may be practiced otherwise than as specifically described. The invention is particularly applicable, but not limited to, rigid sidewall vehicles, having flexible finger seals forward and separate port and starboard stern seals.

What is claimed is:

1. In an air cushion vehicle having a main air cushion enclosed by an upper platform, fixed side walls and inflatable planing seals at the ends, a system for stabilizing the vehicle comprising:

a source of pressurized air;

means within said vehicle for distributing the air from said source to maintain said main air cushion and to inflate said planing seals, said inflated planing seals exerting a force between the water surface and the upper platform proportional in strength to the air pressure within the seal;

control means responsive to the position of a trailing edge of each of said planing seals to control the relative air pressure between the inside of said planing of said planing seals and said main air cushion in such a manner that the vertical and rotational movements of the vehicle relative to the water surface as a whole over the area underneath said vehicle are dampened and minimized.

2. In an air custion vehicle having a main air cushion enclosed by an upper platform, fixed sidewalls and inflatable planing seals at the ends, a system for stabilizing the vehicle comprising:

a source of pressurized air;

means within said vehicle for distributing the air from said source to maintain said main air cushion and to inflate said planing seals, said inflated planing seals exerting a force between the water surface and the upper platform proportional in strength to the air pressure within the seal;

control means responsive to the position of a trailing edge of each of said planing seals to control the relative air pressure between the inside of said planing seals and said main air cushion in such a manner that the vertical and rotational movements of the vehicle relative to the water surface as whole over the area underneath said vehicle are dampened and minimized;

a skeg extending from the stern approximately along the centerline of said vehicle, with two of the said inflatable planing seals mounted at the stern of said vehicle, one of the said seals mounted between the starboard fixed sidewall and said skeg, the other of said seals mounted between the port fixed sidewall and said skeg, the air pressure inside each of said inflatable planing seals being controlled separately by said control means so as to dampen and minimize the roll movements of the air cushion vehicle relative to the water surface as a whole underneath the stern of said vehicle.

3. In an air cushion vehicle having a main air cushion enclosed by an upper platform, fixed sidewalls and inflatable planing seals at the ends, a system for stabilizing the vehicle comprising:

a source of pressurized air;

means within said vehicle for distributing the air from said source to maintain said main air cushion and to inflate said planing seals, said inflated planing seals exerting a force between the water surface and the upper platform proportional in strength to the air pressure within the seal;

control means responsive to the position of a trailing edge of each of said planing seals to control the relative air pressure between the inside of said planing seals and said main air cushion in such a manner that the vertical and rotational movements of the vehicle relative to the water surface as a whole over the area underneath said vehicle are dampened and minimized, said control means further comprising:

a bypass duct for each inflatable planing seal that permits air to flow to the main air cushion from the inside of said seal;

a control valve in each pypass duct; and a position sensing and connecting means between each of said planing seals and its corresponding control valve which controls the position of said valve according to the position of a trailing edge of said planing seal, said control causing the relative air pressure inside said seal to be a function of the distance between the upper platform of the vehicle and the surface of the water beneath said planing seal, said function being adjusted to dampen and minimize the roll, pitch, and heave movements of the air cushion vehicle relative to the water surface as a whole over the area underneath said vehicle.

4. The air cushion vehicle of claim 2 in which said control means further comprises:

a bypass duct for each inflatable planing seal that permits air to flow to the main air cushion from the inside of said seal;

a control valve in each bypass duct;

a position sensing and connecting means between each of said planing seals and its corresponding control valve which controls the position of said valve according to the position of a trailing edge of said planing seal, said control causing the relative air pressure inside said seal to be a function of the distance between the upper platform of the vehicle and the surface of the water beneath said planing seal, said function being adjusted to dampen and minimize roll, pitch and heave movements of the air cushion vehicle relative to the water surface as a whole underneath said vehicle.

5. An automatic pitch, roll, and heave stability control system for air cushion vehicles comprising:

an upper platform with a port side, a starboard side, a bow end, and a stern end;

a pair of rigid sidewalls mounted underneath the upper platform on the port and starboard sides;

a bow planing seal with one edge flexibly attached to the bow end of the upper platform, a second edge in substantially continuous contact with the surface of the water, a third edge sealing against the port sidewall, and a fourth edge sealing against the starboard sidewall;

a bow flexible pneumatic chamber positioned between and pressing apart the bow planing seals and the upper platform;

a skeg attached underneath and extending from the stern of said upper platform approximately parallel to and approximately half way between said port sidewall and said starboard sidewall;

a stern starboard planning seal with one edge flexibly attached to the stern of the upper platform, a second edge in substantially continuous contact with the surface of the water, a third edge sealing against the starboard sidewall, and a fourth edge sealing against said skeg;

a stern starboard flexible pneumatic chamber positioned between and pressing apart the stern starboard planing seal and the upper platform;

a stern port planing seal with one edge flexibly attached to the stern of the upper platform, a second edge in substantially continuous contact with the surface of the water, a third edge sealing against the port sidewall, and a fourth edge sealing against said skeg;

a stern port flexible pneumatic chamber positioned between and pressing apart the stern port planing seal and the upper platform;

at least one source of pressurized air to pressurized said pneumatic chambers and to create a main air cushion which is contained by said upper platform, said sidewalls, said planing seals, and said skeg;

air ducts which allow air to flow between each pneumatic chamber and the main air cushion and the source of pressurized air;

a valve in each air duct connecting a pneumatic chamber with the main air cushion which can be adjusted to control the flow of air through the duct;

a position sensing and control means between each of said valves and the corresponding planing seal, each of said means controlling the valve so that the air pressure inside the pneumatic chamber attached to said corresponding planing seal is a function of the distance between the upper platform and the edge of said planing seal which is in substantially continuous contact with the surface of the water, said function adjusted to dampen and minimize the roll, pitch, and heave movements of the air cushion vehicle relative to the water surface as a whole over the area underneath said vehicle.

6. A system for stabilizing an air cushion vehicle having a main platform, rigid sidewalls attached thereto on the port and starboard sides, and a source of pressurized air comprising:

a plurality of planing seals attached to the platform on the bow and stern ends of the vehicle, with at least one said seal attached to each end, one edge of each seal being attached to the platform and another edge of each seal permitted to move so that it is in substantially continuous contact with the surface of the water, the size, shape and position of the seals being adjusted so that a main air cushion is developed from air provided by the pressurized air source and confined by the main platform, sidewalls and planing seals;

a plurality of variable volume pneumatic chambers, at least one said chamber connected between a movable portion of each planing seal and the main platform so as to exert a force between the platform and the seal;

a plurality of air supply ducts to provide pressurized air from said pressurized air source to each of said pneumatic chambers and to the main air cushion;

a plurality of air exhaust ducts, with at least one connected to each pneumatic chamber to allow air flow out of said pneumatic chamber;

a plurality of valves with at least one valve in each of said air exhaust ducts installed so as to regulate the flow of air through said air duct;

a plurality of position sensing and control means, one of said means connected to each of said valves, said means controlling the position of said valve so as to cause the air pressure in the corresponding pneumatic chamber connected to the exhaust duct containing said valve to vary as a function of the distance between the main platform and a movable portion of the corresponding planing seal attached to said corresponding pneumatic chamber, said function being adjusted so as to dampen an minimize the vertical movements of that portion of the main platform immediately above said corresponding planing seal relative to the water surface underneath said corresponding planing seal.

7. The system of claim 6 wherein:

each position sensing and control means causes the air pressure inside the corresponding pneumatic chamber to be approximately inversly porportional to the magnitude of the distance between the water surface underneath the corresponding planing seal and that portion of the main platform immediately above said corresponding planing seal, said position sensing and control means thereby tending to stabilize said distance at a constant value; and said air exhaust ducts connected to each pneumatic chamber are connected so that air flowing from said chambers through said ducts is exhausted into said main air cushion.

8. The system of claim 7 wherein there is one of said planing seals at the bow end of the vehicle and two of said planing seals at the stern end, and wherein each of said position sensing and control means further comprises a mechanical linkage between the control valve and the edge of the corresponding planing seal which is in substantially continuous contact with the surface of the water, said position sensing and control means causing the roll, pitch and heave movements of the vehicle with respect to the water surface to be dampened and minimized.

9. A system for stabilizing an air cushion vehicle having a main platform, rigid sidewalls attached thereto on the port and starboard sides, and a source of pressurized air comprising:

a plurality of planing seals attached to the platform on the bow and stern ends of the vehicle, with at least one said seal attached to each end, one edge of each seal being attached to the platform and another edge of each seal permitted to move so that it is in substantially continuous contact with the surface of the water, the size, shape and position of the seals being adjusted so that a main air cushion is developed from air provided by the pressurized air source and confined by the main platform, sidewalls and planing seals;

a plurality of variable volume pneumatic chambers, at least one said chamber connected between a movable portion of each planing seal and the main platform so as to exert a force between the platform and the seal;

a plurality of air supply ducts to provide pressurized air from said pressurized air source to each of said pneumatic chambers and to the main air cushion;

a plurality of air exhaust ducts, with at least one connected to each pneumatic chamber to allow air flow out of said pneumatic chamber;

a plurality of valves with at least one valve in each of said air exhaust ducts installed so as to regulate the flow of air through said air duct;

a plurality of position sensing and control means, one of said means connected to each of said valves, said means controlling the position of said valve so as to cause the air pressure in the corresponding pneumatic chamber connected to the exhaust duct containing said valve to vary as a function of the roll and pitch of the air cushion vehicle and the distance between said main platform and a movable portion of said corresponding planing seal, said roll, pitch and distance measured by remote sensors and used to compute said function, said function applied to said valves by servo mechanisms, and said function being adjusted so as to dampen and minimize the roll, pitch and heave movements of said air cushion vehicle with respect to the water surface as a whole over the area underneath said vehicle.

10. A system for stabilizing an air cushion-vehicle having a main platform, rigid sidewalls attached thereto on the port and starboard sides, flexible finger seals at the bow, and a source of pressurized air comprising:

at least one planing seal attached to the platform on the stern of the vehicle, one edge of each seal being attached to the platform and another edge of each seal permitted to move so that it is in substantially continuous contact with the surface of the water, the size, shape and position of the seals being adjusted so that a main air cushion is developed from air provided by the pressurized air source and confined by the main platform, the flexible finger seals, sidewalls and planing seals;

a plurality of variable volume pneumatic chambers, at least one said chamber connected between a movable portion of each planing seal and the main platform so as to exert a force between the platform and the seal;

a plurality of air supply ducts to provide pressurized air from said pressurized air source to each of said pneumatic chambers and to the main air cushion;

a plurality of air exhaust ducts, with at least one connected to each pneumatic chamber to allow air flow out of said pneumatic chamber;

a plurality of valves with at least one valve in each of said air exhaust ducts installed so as to regulate the flow of air through said air duct;

a plurality of position sensing and control means, one of said means connected to each of said valves, said means controlling the position of said valve so as to cause the air pressure in the corresponding pneumatic chamber connected to the exhaust duct containing said valve to vary as a function of the distace between the main platform and a movable portion of the corresponding planing seal attached to said corresponding pneumatic chamber, said function being adjusted so as to dampen and minimize the vertical movements of that portion of the main platform immediately above said corresponding planing seal relative to the water surface underneath said corresponding planing seal.

11. The system of claim 10 wherein:

each position sensing and control means causes the air pressure inside the corresponding pneumatic chamber to be approximately inversly porportional to the magnitude of the distance between the water surface underneath the corresponding planing seal and that portion of the main platform immediately above said corresponding planing seal, said position sensing and control means thereby tending to stabilize said distance at a constant value; and said air exhaust ducts connected to each pneumatic chamber are connected so that air flowing from said chambers through said ducts is exhausted into said main air cushion.

* * * * *